US011468444B2

(12) United States Patent
Mittal et al.

(10) Patent No.: US 11,468,444 B2
(45) Date of Patent: Oct. 11, 2022

(54) METHOD AND SYSTEM FOR BYPASSING MERCHANT SYSTEMS TO INCREASE DATA SECURITY IN CONVEYANCE OF CREDENTIALS

(71) Applicant: Mastercard International Incorporated, Purchase, NY (US)

(72) Inventors: Shreya Mittal, Delhi (IN); Nishant Maheshwari, Uttar Pradesh (IN); Ankur Arora, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 275 days.

(21) Appl. No.: 15/845,070

(22) Filed: Dec. 18, 2017

(65) Prior Publication Data

US 2019/0188710 A1 Jun. 20, 2019

(51) Int. Cl.
*G06Q 20/40* (2012.01)
*G06Q 20/04* (2012.01)
(Continued)

(52) U.S. Cl.
CPC ........ *G06Q 20/401* (2013.01); *G06Q 20/02* (2013.01); *G06Q 20/04* (2013.01);
(Continued)

(58) Field of Classification Search
None
See application file for complete search history.

(56) References Cited

U.S. PATENT DOCUMENTS

| 8,452,961 B2* | 5/2013 | Song | H04L 63/08 |
| | | | 713/170 |
| 9,424,410 B2* | 8/2016 | Ghosh | G06Q 20/4014 |
| (Continued) | | | |

FOREIGN PATENT DOCUMENTS

WO  WO-2016154001 A1 *  9/2016  ............. G06F 21/64

OTHER PUBLICATIONS

Anonymous, "Innovations in payment systems", Monthly Report of Deutsche Bundesbank; Sep. 2012; 64,9 (Year: 2012).*
(Continued)

*Primary Examiner* — Neha Patel
*Assistant Examiner* — Clay C Lee
(74) *Attorney, Agent, or Firm* — Panitch Schwarze Belisario & Nadel LLP

(57) ABSTRACT

A method for transaction initiation with a bypass of merchant systems includes: storing a consumer public key and a blockchain comprised of a plurality of blocks, each block being comprised of a block header and data values, each block header including a block timestamp, and each data value including a unique transaction identifier; receiving a data message originating from a merchant system including a specific transaction identifier, a transaction timestamp, and transaction data; identifying a specific data value in a specific block that includes the specific transaction identifier; verifying that the block timestamp in the specific block is within a predetermined period of time of the transaction timestamp; identifying payment credentials associated with a user transaction account corresponding to the specific data value; and initiating a payment transaction between the merchant system and the transaction account using the identified payment credentials and transaction data.

16 Claims, 5 Drawing Sheets

(51) Int. Cl.
    *G06Q 20/38*     (2012.01)
    *H04L 9/08*     (2006.01)
    *H04L 9/32*     (2006.01)
    *G06Q 20/02*     (2012.01)
    *H04L 9/00*     (2022.01)

(52) U.S. Cl.
    CPC ........... *G06Q 20/3829* (2013.01); *H04L 9/08* (2013.01); *H04L 9/3297* (2013.01); *H04L 9/50* (2022.05); *H04L 2209/56* (2013.01)

(56) References Cited

U.S. PATENT DOCUMENTS

| | | | | |
|---|---|---|---|---|
| 2015/0039513 | A1* | 2/2015 | Adjaoute | H04L 63/1425 705/44 |
| 2016/0292680 | A1* | 10/2016 | Wilson, Jr. | H04L 9/0637 |
| 2016/0342978 | A1* | 11/2016 | Davis | G06Q 20/38215 |
| 2017/0148016 | A1* | 5/2017 | Davis | G06Q 20/401 |
| 2017/0323294 | A1* | 11/2017 | Rohlfing | G06Q 20/401 |
| 2018/0032383 | A1* | 2/2018 | Surcouf | G06F 9/546 |
| 2018/0121918 | A1* | 5/2018 | Higgins | G06Q 20/065 |
| 2018/0197173 | A1* | 7/2018 | Durvasula | G06Q 20/3829 |
| 2018/0349896 | A1* | 12/2018 | Arora | G06Q 20/3829 |
| 2019/0036681 | A1* | 1/2019 | Sundaresan | H04L 9/30 |
| 2020/0236175 | A1* | 7/2020 | Wang | G06Q 20/02 |

OTHER PUBLICATIONS

Wikipedia, ISO 8583, Jan. 20, 2015, pp. 1-13, Retrieved from the Internet: URL:https://en.wikipedia.org/w/index.php?title=ISO_8583&oldid=643350014 [retrieved on Aug. 20, 2018].

Antonopolous, "Mastering Bitcoin—Unlocking Digital Cryptocurrencies" Dec. 20, 2014, O'Reilly Media, Inc., Beijing, Cambridge, Farnham, Köln, Sebastopol, Tokyo.

Notification of Transmittal of the International Search Report and the Written Opinion of the International Searching Authority (Forms PCT/ISA/220, PCT/ISA/210 and PCT/ISA/237) dated Mar. 6, 2019, by the European Patent Office in corresponding International Application No. PCT/US2018/061171. (12 pages).

* cited by examiner

METHOD AND SYSTEM FOR BYPASSING MERCHANT SYSTEMS TO INCREASE DATA SECURITY IN CONVEYANCE OF CREDENTIALS

FIELD

The present disclosure relates to the initiation of transactions that bypass merchant systems, specifically the use of a blockchain to bypass the conveyance of payment credentials to a merchant system.

BACKGROUND

Consumers that engage in electronic payment transactions are often willing to sacrifice security for the sake of convenience. For instance, many consumers that use merchant websites or application programs for conducting electronic payment transactions with a merchant are willing to provide their payment credentials to the merchant for storage thereby for use in future transactions. This action can provide the consumer with an opportunity later on to select use of their saved payment credentials, negating the need to re-enter all of the information, saving the consumer time and effort. In addition, this can serve as a protection against man-in-the-middle attacks where the data may be intercepted as it is submitted to the merchant.

However, such methods are only as effective as the storage mechanism used by the merchant to store the payment credentials they have been provided. With the increase in the number of electronic payment transactions that are processed there has been a significant rise in the number of cyber-attacks on merchant systems to access stored payment credentials. In some cases, millions of payment credentials have been stolen at once on more than one occasion. As a result, some consumers have become wary in having merchants store their payment credentials. However, as noted above, the entry of payment credentials for use every transaction may leave the credentials open to being compromised during their transmission. Unfortunately, there is no system available that can enable a consumer to bypass a merchant system when providing their payment credentials for funding an electronic payment transaction.

Thus, there is a need for a technological solution whereby an electronic payment transaction may be initiated that is funded using payment credentials that are not provided to the merchant involved in the payment transaction.

SUMMARY

The present disclosure provides a description of systems and methods for transaction initiation with a bypass of merchant systems. A blockchain is used to store data associated with a transaction that is approved for initiation by a consumer. The merchant submits data that identifies the approval that is stored in the blockchain in lieu of a traditional payment transaction. A processing server receives the data, verifies that it corresponds to the approved transaction based on what is stored in the blockchain, and initiates the corresponding payment transaction using payment credentials previously provided by the consumer. Thus, a payment transaction is initiated without the merchant ever receiving the payment credentials, preventing any dangers of theft or man-in-the-middle attacks involving the merchant and with only minor modifications to merchant systems, with significant technical advantage over prior systems.

A method for transaction initiation with a bypass of merchant systems includes: storing, in a memory of a processing server, at least a consumer public key of a cryptographic key pair and a blockchain, wherein the blockchain is comprised of a plurality of blocks, each block being comprised of at least a block header and one or more data values, where each block header includes at least a block timestamp and each of the one or more data values includes a unique transaction identifier; receiving, by a receiving device of the processing server, a data message originating from a merchant system, wherein the data message includes at least a specific transaction identifier, a transaction timestamp, and transaction data; executing, by a querying module of the processing server, a query on the memory to identify a specific data value included in a specific block of the plurality of blocks comprising the blockchain where the included unique transaction identifier corresponds to the specific transaction identifier; verifying, by a verification module of the processing server, that the block timestamp included in the block header included in the specific block is within a predetermined period of time of the transaction timestamp; executing, by the querying module of the processing server, a query to identify payment credentials associated with a user transaction account corresponding to the specific data value, wherein the payment credentials are identified following successful verification; and initiating, by a transaction processing module of the processing server, a payment transaction between the merchant system and the transaction account using at least the identified payment credentials and transaction data.

A system for transaction initiation with a bypass of merchant systems includes: a transaction processing module of a processing server; a memory of the processing server configured to store at least a consumer public key of a cryptographic key pair and a blockchain, wherein the blockchain is comprised of a plurality of blocks, each block being comprised of at least a block header and one or more data values, where each block header includes at least a block timestamp and each of the one or more data values includes a unique transaction identifier; a receiving device of the processing server configured to receive a data message originating from a merchant system, wherein the data message includes at least a specific transaction identifier, a transaction timestamp, and transaction data; a querying module of the processing server configured to execute a query on the memory to identify a specific data value included in a specific block of the plurality of blocks comprising the blockchain where the included unique transaction identifier corresponds to the specific transaction identifier; and a verification module of the processing server configured to verify that the block timestamp included in the block header included in the specific block is within a predetermined period of time of the transaction timestamp, wherein the querying module of the processing server is further configured to execute a query to identify payment credentials associated with a user transaction account corresponding to the specific data value, wherein the payment credentials are identified following successful verification, and the transaction processing module of the processing server is configured to initiate a payment transaction between the merchant system and the transaction account using at least the identified payment credentials and transaction data.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
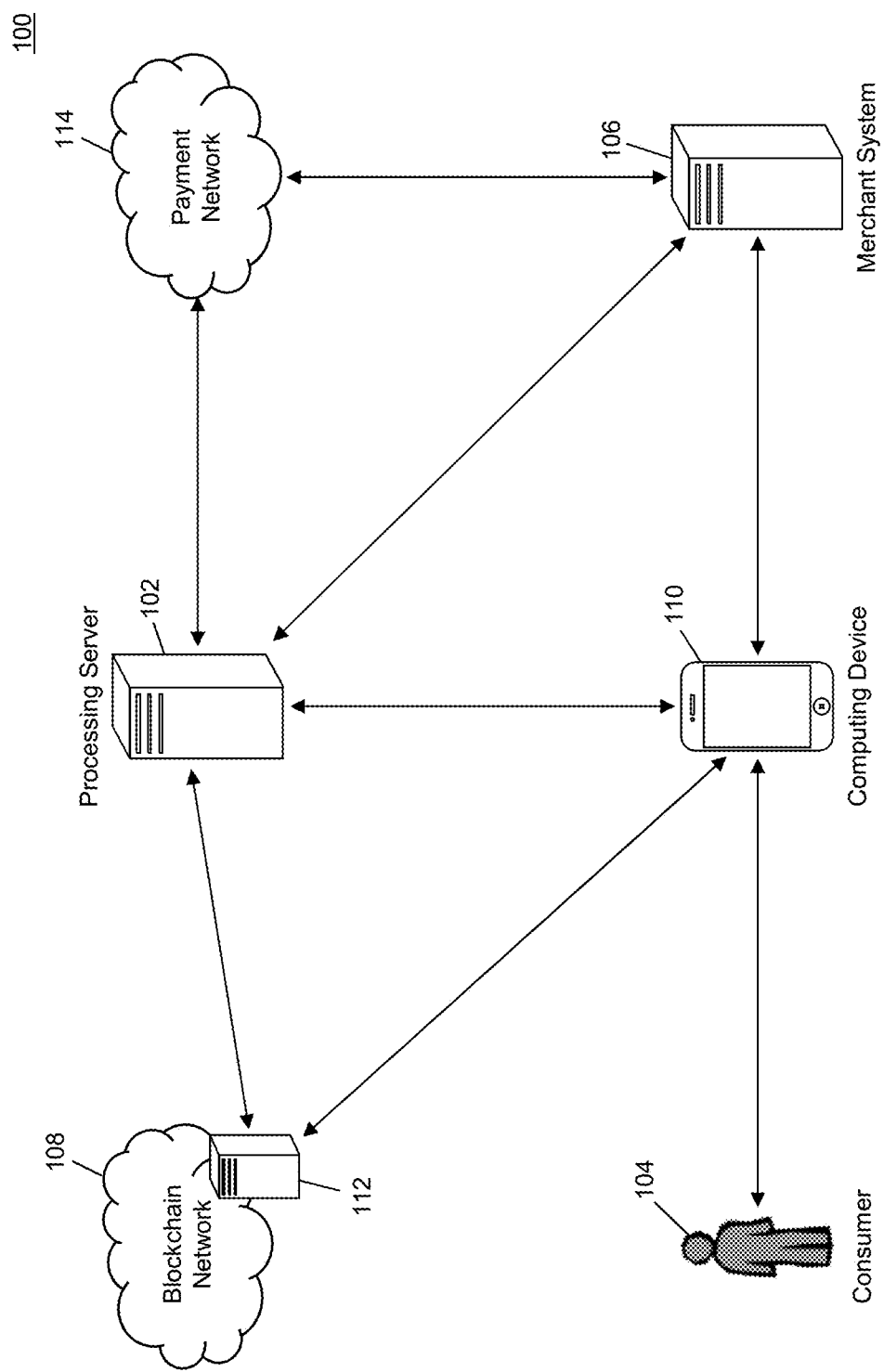
FIG. 1 is a block diagram illustrating a high level system architecture for bypassing of merchant credentials in electronic payment transactions in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for the Bypassing of Merchant Systems

FIG. 1 illustrates a system 100 for the initiation of payment transactions that includes a bypassing of merchant systems with respect to the providing of payment credentials for use in funding the payment transactions.

The system 100 may include a processing server 102. The processing server 102, discussed in more detail below, may be configured to initiate electronic payment transactions that bypass merchant systems, enabling a payment transaction to be conducted without the providing of payment credentials to a merchant. In the system 100, a consumer 104 may wish to engage in an electronic payment transaction with a merchant system 106. Traditionally, the consumer 104 may utilize a computing device 110, such as a desktop computer, notebook computer, laptop computer, tablet computer, cellular phone, smart phone, smart watch, smart television, wearable computing device, implantable computing device, etc., to initiate an electronic payment transaction with the merchant system 106, such as via a web page or application program. In these traditional transactions, the consumer 104 may input their payment credentials into the computing device 110 using a suitable input method, which may be communicated to the merchant system 106 using a suitable communication network and method. The merchant system 106 would then initiate the processing of the payment transaction, such as by submitting a transaction message to a payment network 114 via payment rails associated therewith, which would process the payment transaction using traditional methods.

However, as discussed above, such a submission of payment credentials may leave the credentials subject to theft or intercept during transmission to the merchant system 106, input into the computing device 110, or storage in the merchant system 106. To increase the security of the payment credentials throughout the transaction process, the processing server 102 is configured to bypass the merchant system 106 with respect to the credentials when a new payment transaction is initiated. In the system 100, when the consumer 104 is interested in conducting an electronic payment transaction, the consumer 104 may submit a transaction request via the computing device 110. The transaction request may be an indication that the consumer 104 wishes to engage in an electronic payment transaction with the merchant system 106.

In one embodiment, the consumer 104 may submit the transaction request to the processing server 102 via the computing device 110, such as using a web page, application program, application programming interface, or other suitable communication method. The transaction request may include a time at which the transaction is to take place, or the processing server 102 may identify a timestamp for when the transaction request is received. In some embodiments, the transaction request may include data associated with the requested payment transaction, such as an expected transaction amount, merchant identifier associated with the merchant system 106, geographic location, etc. A unique identifier, also referred to herein as a transaction identifier, may be identified for the proposed payment transaction. The transaction identifier may be a value that is unique to the specific payment transaction, and may be identified by the processing server 102 and provided to the consumer 104 (e.g., via the computing device 110) in response to the transaction request or identified by the consumer 104 and/or computing device 110 and included in the transaction request.

In some embodiments, the transaction request may include payment credentials associated with a transaction account that are to be used to fund the payment transaction. In other embodiments, payment credentials may have been previously provided to the processing server 102 for storage thereby, where the payment credentials may be indicated in the transaction request. For instance, the processing server 102 may store the payment credentials in an account profile associated with the consumer 104, discussed in more detail below, which may be identified via an account identifier, which may be included in the transaction request.

The system 100 may include a blockchain network 108. When a transaction request is received, a new data value may be added to the blockchain associated with the blockchain network 108 that corresponds to the transaction request. In embodiments where the transaction request is submitted to the processing server 102, the processing server 102 may submit the data for inclusion in the data value to the blockchain network 108 via a node 112 thereof, where the blockchain network 108 may be comprised of a plurality of nodes 112. In other embodiments, the consumer 104 may submit the transaction request (e.g., via the computing device 110) directly to a node 112 in the blockchain network 108. In such embodiments, the consumer 104 may include an account identifier in the transaction request for forwarding to the processing server 102 by the node 112, or may electronically transmit a separate transaction request to the processing server 102, which may include the account identifier and the transaction identifier.

The node 112 may receive the transaction request and may generate a new data value to be included in a new block that is verified and added to the blockchain. The blockchain may be comprised of a plurality of blocks. Each block may be comprised of a block header and one or more data values. The block header may include at least a timestamp, a block reference, and a data reference. The timestamp may be a time when the block header was generated. The block reference may be a reference to the prior block added to the blockchain before the block that includes the block header, such as may be identified via the timestamp. The data reference may be a reference to the data values included in the respective block. In some embodiments, the block reference and data reference may be hash values generated via the application of hashing algorithms to the respective data. The use of the reference values may ensure immutability of the blockchain, as modification to any data in the blockchain would necessitate modification of the transaction reference and block reference in a block where data modified and in the block reference included in every subsequent block in the blockchain. In addition, each of the nodes 112 in the blockchain network 108 is configured to store a copy of the blockchain, and, as a result, such modifications would have to be performed at every node 112 in the blockchain network 108 prior to the addition of a new block to the blockchain, making modification of the blockchain computationally impossible for all practical purposes.

Once the transaction request is submitted to the node 112, the node 112 may generate a new data value for the proposed payment transaction that includes at least the transaction identifier associated therewith. In some embodiments, the data value may also include the transaction data submitted by the consumer 104 and, in some cases, the account identifier that indicates the transaction account to be used to fund the payment transaction. In some cases, the timestamp may also be included. In other cases, the timestamp included in the block header may be used in place of the timestamp identified for the specific proposed payment transaction. In instances where the consumer 104 supplies the timestamp as an expected future time when the transaction is to take place, the timestamp may be included in the data value.

Once the data value is generated, the node 112 may include the data value in a new block that is generated, which may be verified by one or more other nodes 112 in the blockchain network 108 and then added to the blockchain using traditional methods and systems. The data value may then be made available for viewing in the blockchain by any authorized entity. In some instances, the blockchain may be a public blockchain, where the consumer 104 or any other entity may view the data value (e.g., to ensure that it was submitted and included successfully). In other instances, the blockchain may be a private or hybrid blockchain, where access to the data values may only be performed by authorized entities, such as the processing server 102.

Following the inclusion of the data value in the blockchain, the consumer 104 may contact the merchant system 106 to begin the process for initiating the electronic payment transaction. The consumer 104 may use traditional methods and systems for interacting with the merchant system 106, such as by accessing a web page, application program, application programming interface, or other suitable interface, such as may be performed via the computing device 110. In place of providing payment credentials to the merchant system 106 for a payment transaction, the consumer 104 may instead supply the merchant system 106 with the transaction identifier. The merchant system 106 may receive the transaction identifier from the consumer 104, and may submit a data message to the processing server 102 in place of the submission of a traditional transaction message. In some embodiments, the data message may be electronically transmitted to the processing server 102 using a communication method other than payment rails associated with a payment network 114, which is used in traditional electronic payment transactions. In other embodiments, the data message may be submitted via the payment rails, either directly to the payment network 114 (e.g., for forwarding to the processing server 102) or to the processing server 102 using the network infrastructure as made available by the payment network 114. In such embodiments, the data message may be a traditional transaction message (e.g., an authorization request as indicated by ISO 8583 or ISO 20022), where the transaction identifier may be included in place of a primary account number. In some cases, the processing server 102 may be a part of the payment network 114.

The data message submitted by the merchant system 106 to the processing server 102 may include at least the transaction identifier, a transaction timestamp, and other transaction data. In some cases, the processing server 102 may identify the timestamp when the data message is received thereby. The other transaction data may include any data used by the processing server 102 in the initiation and processing of the payment transaction, such as a transaction amount and account details associated with a transaction account of the merchant system 106 for receipt of the transaction amount. The processing server 102 may identify the data value in the blockchain that corresponds to the data message submitted by the merchant system 106 using the transaction identifier. The processing server 102 may then verify that the transaction is to take place. The verification may be based on at least a comparison of the data included in the data value and the data included in the received data message. For instance, the processing server 102 may verify that the timestamp included in the data message matches, or is within a predetermined period of time (e.g., ten minutes, one hour, etc.) of the timestamp stored in the data value included in the blockchain. Additional verification may be performed based on the amount of data included in the data value, such as comparing a transaction amount stored in the blockchain with the transaction amount submitted in the data message, comparison of a merchant identifier stored in the blockchain to a merchant identifier submitted in the data message and associated with the merchant system 106. In other words, the processing server 102 may confirm that the data message submitted by the merchant system 106 matches the payment transaction that was proposed by the consumer 104 in their transaction request, to prevent fraud.

If the verification is unsuccessful, the processing server 102 may inform the merchant system 106, which may make another attempt at verification and/or indicate to the consumer 104 (e.g., via the computing device 110) that the verification was unsuccessful. For instance, the consumer 104 may have mistyped the transaction identifier, and may remedy the error for a new submission to be made by the merchant system 106. If the verification is successful, the processing server 102 may initiate an electronic payment transaction for payment of the transaction amount from the transaction account indicated by the consumer 104 to the merchant system 106. As part of the initiation, the processing server 102 may identify the payment credentials for the transaction account indicated by the consumer 104, such as by using the account identifier stored in the data value included in the blockchain or identifying the account identifier and/or payment credentials based on the transaction identifier, depending on implementation and the data submissions by the consumer 104. The payment credentials may be included in a transaction message that is submitted by the processing server 102 to the payment network 114 via the payment rails associated therewith for the electronic payment transaction. The transaction message may also include the transaction amount included in the data message and any other transaction data that may be included therein as may be necessary for the processing of the payment transaction.

The payment network 114 may then process the payment transaction using traditional methods and systems. Once the payment transaction is processed, the payment network 114 may provide an authorization response to the processing server 102 indicating if the payment transaction was approved or denied. The processing server 102 may then inform the merchant system 106 accordingly, which may finalize the payment transaction based thereon. In some embodiments, the processing server 102 may notify the blockchain network 108 of the transaction processing, which may then add a new value into a new block in the blockchain that indicates that the payment transaction was processed, such as indicated by the transaction identifier. For instance, the transaction identifier may be included in a data value with a new timestamp, transaction amount, or other data that may prevent verification for any future transaction.

In some embodiments, digital signatures may be used to provide further security. In such embodiments, the computing device 110 may generate a cryptographic key pair that is comprised of a private key and public key, referred to herein as a consumer private key and consumer public key, respectively. The consumer 104 may, using the computing device 110, generate a digital signature for submissions using the consumer private key. For instance, the consumer 104 may digitally sign the transaction request, as well as the transmission of the transaction identifier to the merchant system 106. The processing server 102 may retain a copy of the consumer public key, which may be used thereby to verify the digital signature on submissions received from the computing device 110 and/or merchant system 106. For example, the digital signature may be provided to the merchant system 106 by the computing device 110 along with the transaction identifier, which may be included in the data message submitted to the processing server 102 by the merchant system 106. The processing server 102 may verify the digital signature (e.g., using the public key) along with the other data, such as to ensure that the transaction was proposed by the same computing device 110 that submitted to the transaction request, to further prevent fraud.

The methods and systems discussed herein enable the processing server 102 to facilitate the initiation of an electronic payment transaction that bypasses merchant systems 106 with respect to payment credentials. The consumer 104 and merchant system 106 can communicate using traditional methods, but where a unique transaction identifier is used in place of any traditional account information. The merchant system 106 submits the transaction identifier rather than payment credentials, which is used by the processing server 102 to identify the payment credentials for use in the payment transaction. At the same time, a blockchain is used to store data used to verify that the payment transaction is to be conducted, to prevent fraud on the part of merchant systems 106 or nefarious actors purporting to be merchants. The use of a blockchain ensures that the data cannot be tampered with or modified in any way, such that only transactions explicitly authorized by the consumer 104 may be initiated. Thus, consumers 104 may freely engage in electronic commerce with merchant systems 106 without providing payment credentials thereto, resulting in significantly greater account security.

Processing Server

Figure 2:
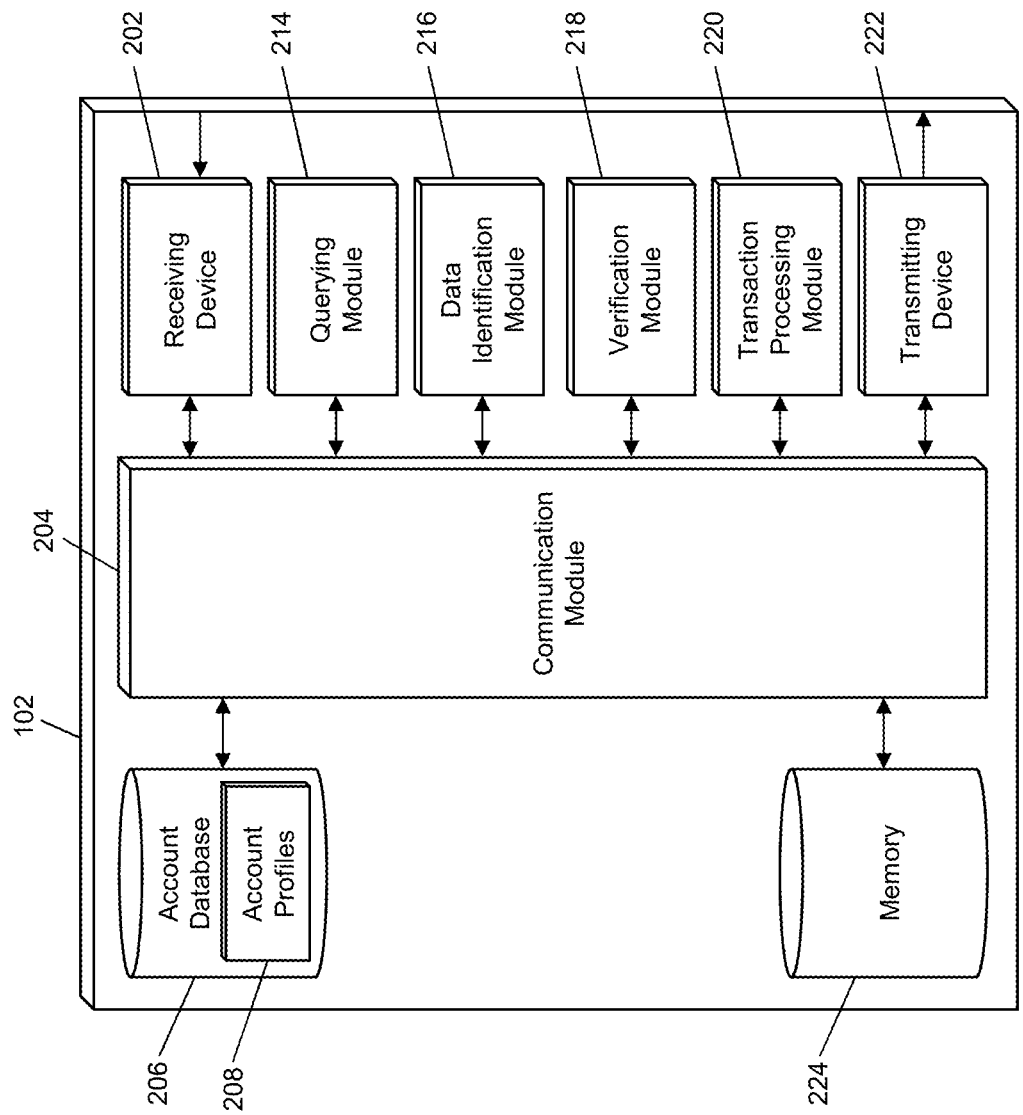
FIG. 2 is a block diagram illustrating the processing server of the system of FIG. 1 for the initiation of payment transactions while bypassing merchant systems in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from merchant systems 106, computing devices 110, nodes 112, payment networks 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by merchant systems 106, which may be superimposed or otherwise encoded with data messages. Data messages may include at least a transaction identifier, a timestamp, a transaction amount, and any other transaction data that may be used in the initiation of a payment transaction. In some embodiments, data message may be transmitted using payment rails and may be specially formatted pursuant to one or more standards governing the exchange of transaction messages, such as the ISO 8583 or ISO 20022 standards. The receiving device 202 may also be configured to receive data signals electronically transmitted by computing devices 110, which may be superimposed or otherwise encoded with transaction requests, which may include a transaction identifier, timestamp, account identifier, and/or other data as discussed herein, and/or may also include payment credentials associated with a transaction account. The receiving device 202 may also be configured to receive data signals electronically transmitted by nodes 112 in the blockchain network 108, which may be superimposed or otherwise encoded with new blockchain data for use by the processing server 102. The receiving device 202 may also be configured to receive data signals electronically transmitted by payment networks 114 via payment rails associated therewith, which may be superimposed or otherwise encoded with transaction messages, such as authorization responses for payment transactions initiated by the processing server 102.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, data identification module 216, verification module 218, transaction processing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account, including at least an account identifier associated therewith a payment credentials for use in funding payment transactions using the related transaction account. In some cases, an account profile 208 may also include transaction identifiers corresponding to submitted transaction requests for proposed electronic payment transactions that are to be funded by the related transaction account. In cases where digital signatures are used, an account profile 208 may also include a consumer public key.

The processing server 102 may include a querying module 214. The querying module 214 may be configured to execute queries on databases to identify information. The querying module 214 may receive one or more data values or query strings, and may execute a query string based thereon on an indicated database, such as the account database 206, to identify information stored therein. The querying module 214 may then output the identified information to an appropriate engine or module of the processing server 102 as necessary. The querying module 214 may, for example, execute a query on the account database 206 to identify an account profile 208 that includes the transaction identifier included in a data message received from a merchant system 106 for identification of the payment credentials stored therein.

The processing server 102 may also include a data identification module 216. The data identification module 216 may be configured to identify data for use by the processing server 102 in performing the functions discussed herein. The data identification module 216 may receive instructions as input, may identify data based on the instructions, and may output the identified data to another module or engine of the processing server 102. For example, the data identification module 216 may be configured to identify transaction identifiers for received transaction requests, identify account identifiers based on transaction identifier and account identifier pairs using received transaction identifiers, etc.

The processing server 102 may also include a verification module 218. The verification module 218 may be configured to verify data for the processing server 102 for performing the functions discussed herein. The verification module 218 may be configured to receive data to be verified as input, may attempt to verify the data, and may output a result of the attempted verification to another module or engine of the processing server 102. For example, the verification module 218 may be configured to verify data received in a data message submitted by a merchant system 106, such as by comparing it to data stored in a data value included in the blockchain (e.g., identified by the querying module 214 and/or data identification module 216). In embodiments where digital signatures are used, the verification module 218 may also be configured to verify digital signatures using public keys via signature generation and verification algorithms.

The processing server 102 may also include a transaction processing module 220. The transaction processing module 220 may be configured to perform functions of the processing server 102 related to the initiation and processing of electronic payment transactions, as will be apparent to persons having skill in the relevant art. The transaction processing module 220 may be configured to, for example, generate transaction messages that are compliant with one or more standards, such as the ISO 8583 or ISO 20022 standards, that include the payment credentials identified in an account profile 208 and transaction data parsed from a received data message, which may then be transmitted to a payment network 114 for processing thereby.

The processing server 102 may also include a transmitting device 222. The transmitting device 222 may be configured to transmit data over one or more networks via one or more network protocols. In some instances, the transmitting device 222 may be configured to transmit data to merchant systems 106, computing devices 110, nodes 112, payment networks 114, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to merchant systems 106 that are superimposed or otherwise encoded with authorization responses or other data indicating successful or unsuccessful processing of a payment transaction, which may include at least the transaction identifier corresponding to the payment transaction. The transmitting device 222 may also be configured to electronically transmit data signals to computing devices 110, which may be superimposed or otherwise encoded with confirmation notifications, such as confirming receipt and posting of proposed transaction data, which may include, for example, a transaction identifier identified for a received transaction request. The transmitting device 222 may also be configured to electronically transmit data signals to nodes 112 in the blockchain network 108, which may be superimposed or otherwise encoded with a data value or data for inclusion therein for use by the node 112 in adding a new data value to the blockchain. The transmitting device 222 may also be configured to electronically transmit data signals to payment networks 114 via payment rails associated therewith that are superimposed or otherwise encoded with transaction messages for a payment transaction, which may include payment credentials, a transaction amount, and other transaction data as discussed herein.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, blockchain data, transaction formatting rules, digital signature verification algorithms, etc.

Process for Bypassing Merchant Systems in Transaction Initiation

Figure 3:
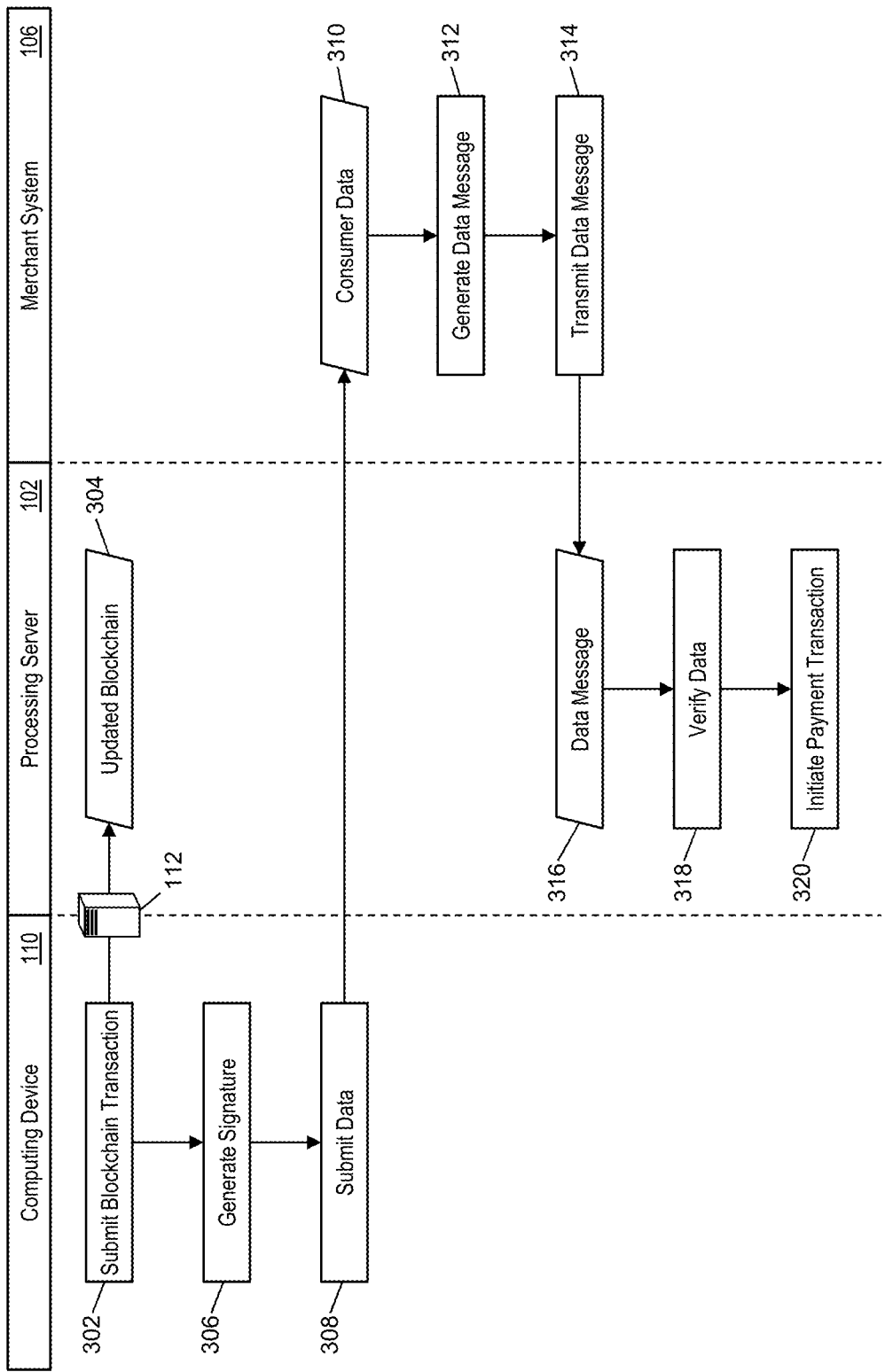
FIG. 3 is a flow diagram illustrating a process for initiating a payment transaction with a merchant bypass in the system of FIG. 1 in accordance with exemplary embodiments.

FIG. 3 illustrates a process conducted in the system 100 for the initiation of an electronic payment transaction that bypasses a merchant system 106 with respect to payment credentials associated with a transaction account used to fund the transaction.

In step 302, the consumer 104 may, using the computing device 110, submit a new blockchain transaction to a node 112 in the blockchain network 108 that corresponds to an upcoming electronic payment transaction. The blockchain transaction may include at least a transaction identifier, account identifier, and a timestamp. The node 112 may include the transaction as a data value in a new block that is verified and added to the blockchain. In step 304, the receiving device 202 of the processing server 102 may receive, from a node 112 in the blockchain network 108, an updated blockchain where one of the blocks included therein that includes a data value corresponding to the blockchain transaction submitted by the computing device 110.

In step 306, the computing device 110 may generate a digital signature using a consumer private key stored therein. In some embodiments, the digital signature may be generated over data to be transmitted to the merchant system 106, where such data may include at least the transaction identifier corresponding to the proposed electronic payment transaction. In step 308, the digital signature and transaction identifier may be submitted to the merchant system 106 using a suitable communication network and method, such as via a web page, application program, application programming interface, etc. In some instances, the consumer 104 may be at a physical location of the merchant system 106, where the computing device 110 may electronically transmit the data to the merchant system 106 using a communication method suitable for such transmission, such as near field communication, local area network, Bluetooth, radio frequency, etc. In step 310, the merchant system 106 may receive the digital signature and the transaction identifier for the proposed electronic payment transaction.

In step 312, the merchant system 106 may generate a data message. The data message may include at least the data provided by the computing device 110 and may also include additional transaction data suitable for use in processing the electronic payment transaction, such as a transaction amount, transaction time and/or date, geographic location, account information for a transaction account used to receive funds for the payment transaction, etc. In some embodiments, the data message may be a transaction message suitable for transmission via payment rails. In other embodiments, the data message may not be formatted as a transaction message. In step 314, the merchant system 106 may electronically transmit the data message to the processing server 102, which may be transmitted via payment rails or by a separate type of communication network.

In step 316, the receiving device 202 of the processing server 102 may receive the data message and parse the data included therein. In step 318, the verification module 218 of the processing server 102 may verify the data included in the data message by comparing it to the data included in the data value corresponding to the proposed electronic payment transaction as stored in the blockchain such as may be identified (e.g., via execution of a query by the querying module 214 of the processing server 102) by the transaction identifier included in the data message. The verification module 218 may verify, for instance, the transaction amount, a merchant identifier, etc. The verification module 218 may also verify the digital signature using a consumer public key, such as may be stored in an account profile 208 of the account database 206 that is associated with the proposed electronic payment transaction, identified via an account identifier included in the data value and/or data message or via the transaction identifier. If verification is successful, then, in step 320, the transaction processing module 220 of the processing server 102 may generate a transaction message for the electronic payment transaction of payment of the transaction amount from the consumer 104, where the transaction message may include payment credentials identified in the account profile 208 and is electronically transmitted, by the transmitting device 222 of the processing server 102, to the payment network 114 via payment rails associated therewith for processing thereby.

Exemplary Method for Transaction Initiation with a Bypass of Merchant Systems

Figure 4:
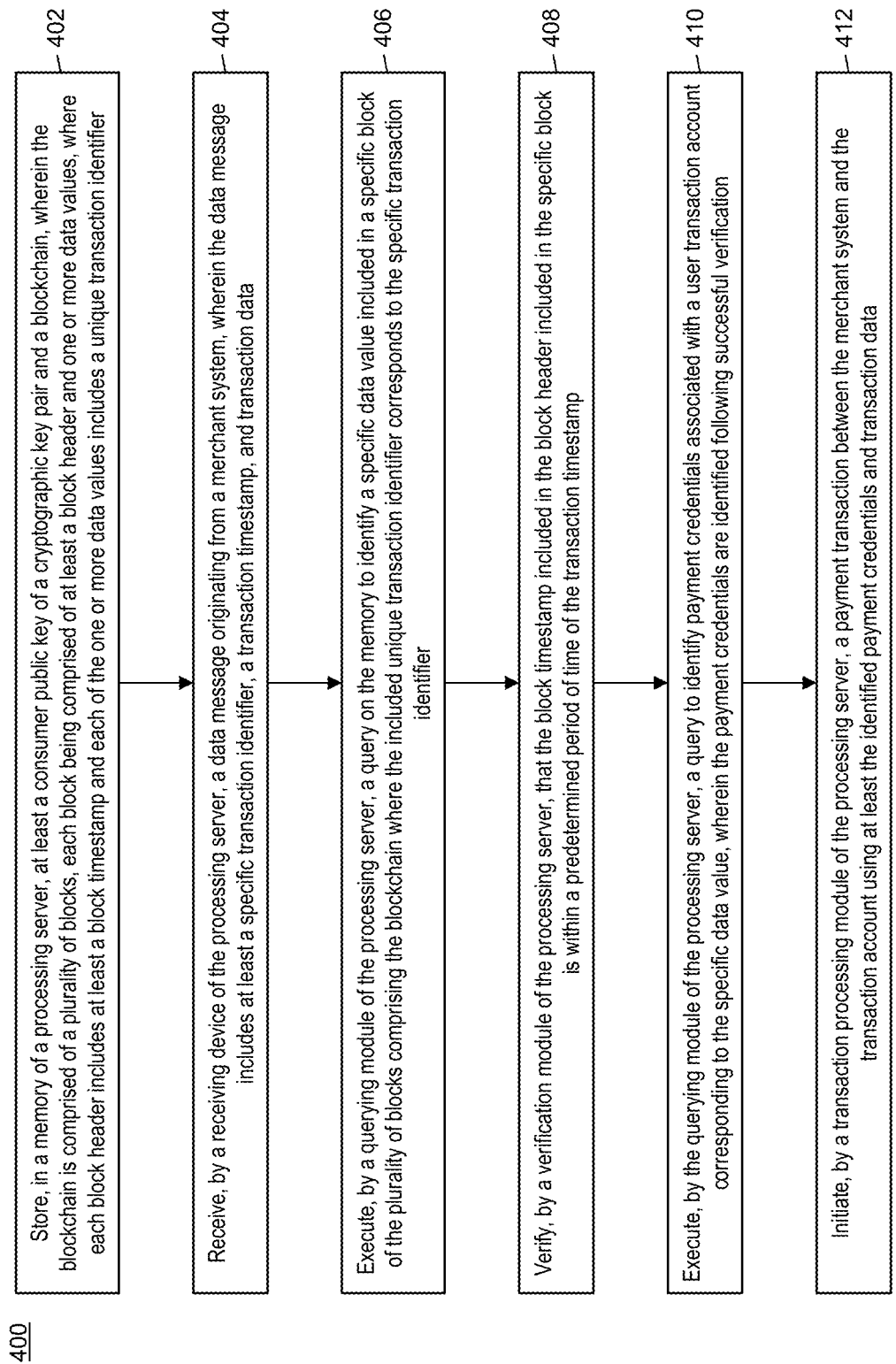
FIG. 4 is a flow chart illustrating an exemplary method for transaction initiation with a bypass of merchant systems in accordance with exemplary embodiments.

FIG. 4 illustrates a method 400 for the initiation of an electronic payment transaction that bypasses the conveyance of payment credentials to a merchant system.

In step 402, at least a consumer public key of a cryptographic key pair and a blockchain may be stored in a memory (e.g., the memory 224) of a processing server (e.g., the processing server 102), wherein the blockchain is comprised of a plurality of blocks, each block being comprised of at least a block header and one or more data values, where each block header includes at least a block timestamp and each of the one or more data values includes a unique transaction identifier. In step 404, a data message originating from a merchant system (e.g., the merchant system 106) may be received by a receiving device (e.g., the receiving device 202) of the processing server, wherein the data message includes at least a specific transaction identifier, a transaction timestamp, and transaction data.

In step 406, a query may be executed on the memory by a querying module (e.g., the querying module 214) of the processing server to identify a specific data value included in a specific block of the plurality of blocks comprising the blockchain where the included unique transaction identifier corresponds to the specific transaction identifier. In step 408, a verification module (e.g., the verification module 218) of the processing server may verify that the block timestamp included in the block header included in the specific block is within a predetermined period of time of the transaction timestamp.

In step 410, a query may be executed by the querying module of the processing server to identify payment credentials associated with a user transaction account corresponding to the specific data value, wherein the payment credentials are identified following successful verification. In step 412, a payment transaction may be initiated by a transaction processing module (e.g., the transaction processing module 220) of the processing server between the merchant system and the transaction account using at least the identified payment credentials and transaction data.

In one embodiment, the transaction data may include at least a transaction amount and account information associated with a merchant transaction account of the merchant system, and the payment transaction may be for payment of the transaction amount from the user transaction account to the merchant transaction account. In some embodiments, the data message may be received by the processing server via a communication network that does not utilize payment rails. In one embodiment, the payment credentials may be identified in a data value included in one of the plurality of blocks comprising the blockchain.

In some embodiments, the method 400 may further include verifying, by the verification module of the processing server, a digital signature using the consumer public key, wherein the payment credentials are further identified following successful verification of the digital signature. In a further embodiment, the digital signature may be included in the received data message. In another further embodiment, the method 400 may even further include receiving, by the receiving device of the processing server, the digital signature from a user computing device (e.g., the computing device 110) prior to verification of the digital signature.

In one embodiment, the method 400 may also include storing, in an account database (e.g., the account database 206) of the processing server, an account profile (e.g., an account profile 208), wherein the account profile is a structured data set related to the user transaction account and includes at least the payment credentials and an identification value, wherein identifying the payment credentials includes executing the query on the account database to identify the account profile and the payment credentials included therein. In a further embodiment, the specific data value may further include the identification value. In another further embodiment, the identification value may be a blockchain identifier associated with the blockchain.

Computer System Architecture

Figure 5:
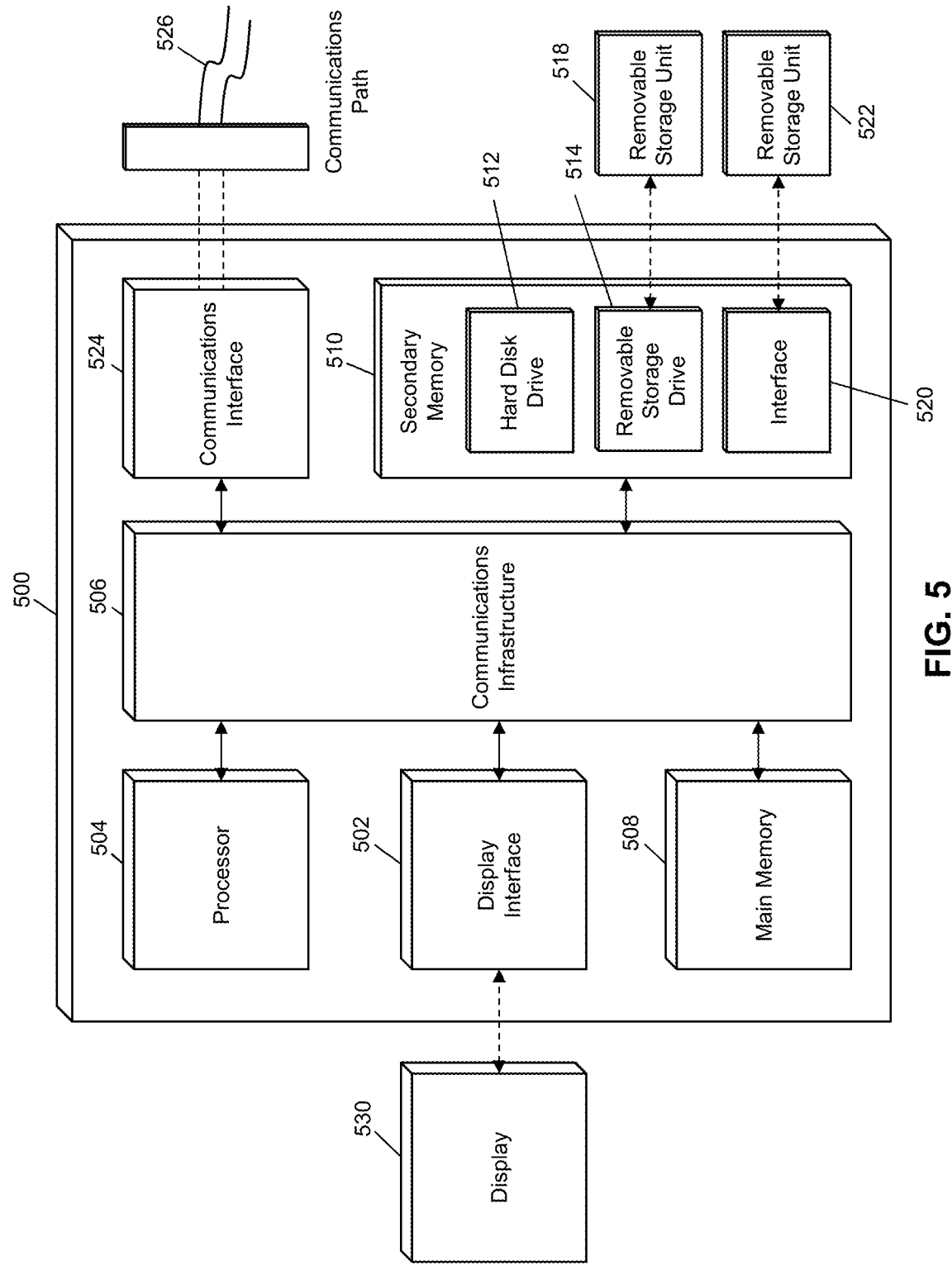
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for transaction initiation with a bypass of merchant systems. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for transaction initiation with a bypass of merchant systems, comprising:

storing, in a memory of a processing server, at least a consumer public key of a cryptographic private-public key pair and a blockchain, wherein the blockchain is comprised of a plurality of blocks, each block being comprised of at least a block header and one or more data values, where each block header includes at least a block timestamp and each of the one or more data values includes a unique transaction identifier, and wherein the unique transaction identifier of at least one block header in the plurality of blocks is a second unique transaction identifier for a future payment transaction;

receiving, by a receiving device of the processing server, a first transaction request from a mobile computing device, the first transaction request including transaction data and payment credentials associated with the future payment transaction;

storing, in the blockchain of the memory, the transaction data and the payment credentials associated with the future payment transaction;

receiving, by the receiving device of the processing server, a data message originating from a merchant system, wherein the data message includes at least a digital signature of a user computing device, a specific transaction identifier of a current transaction, a transaction timestamp, and transaction data associated with the current payment transaction;

executing, by a querying module of the processing server, a query on the memory, the query identifying a specific data value included in a specific block of the plurality of blocks comprising the blockchain where the second unique transaction identifier of the future payment transaction corresponds to the specific transaction identifier of the current payment transaction;

verifying, by a verification module of the processing server, that:
the user computing device which generated the first transaction request associated with the future payment transaction also generated a second transaction request associated with the current payment transaction, wherein the digital signature of the user computing device is verified using the stored consumer public key of the cryptographic private-public key pair; and the block timestamp included in the block header of the specific block of the future transaction is within a predetermined period of time of the transaction timestamp of the current transaction;

executing, by the querying module of the processing server if the digital signature of the user computing device is successfully verified, a query to identify payment credentials associated with a user transaction account corresponding to the specific data value of the blockchain, wherein the payment credentials are identified following successful verification; and initiating, by a transaction processing module of the processing server, the future payment transaction between the merchant system and the user transaction account by submitting a transaction message, which includes at least the identified payment credentials stored in the blockchain and the transaction data associated with the future payment transaction, to a payment network over payment rails.

2. The method of claim 1, wherein
the transaction data includes at least a transaction amount and account information associated with a merchant transaction account of the merchant system, and
the payment transaction is for payment of the transaction amount from the user transaction account to the merchant transaction account.

3. The method of claim 1, wherein the data message is received by the processing server via a communication network that does not utilize payment rails.

4. The method of claim 1, wherein
the payment credentials are further identified following successful verification of the digital signature.

5. The method of claim 1, wherein the payment credentials are identified in a data value included in one of the plurality of blocks comprising the blockchain.

6. The method of claim 1, further comprising:
storing, in an account database of the processing server, an account profile, wherein the account profile is a structured data set related to the user transaction account and includes at least the payment credentials and an identification value, wherein
identifying the payment credentials includes executing a query on the account database to identify the account profile and the payment credentials included therein.

7. The method of claim 6, wherein the specific data value further includes the identification value.

8. The method of claim 6, wherein the identification value is a blockchain identifier associated with the blockchain.

9. A system for transaction initiation with a bypass of merchant systems, comprising:
a transaction processing module of a processing server;
a memory of the processing server configured to store at least a consumer public key of a cryptographic private-public key pair and a blockchain, wherein the blockchain is comprised of a plurality of blocks, each block being comprised of at least a block header and one or more data values, where each block header includes at least a block timestamp and each of the one or more data values includes a unique transaction identifier, and wherein the unique transaction identifier of at least one block header in the plurality of blocks is a second unique transaction identifier for a future payment transaction;

a receiving device of the processing server configured to receive a first transaction request from a mobile computing device, the first transaction request including transaction data and payment credentials associated with the future payment transaction, and a data message originating from a merchant system, wherein the data message includes at least a digital signature of a user computing device, a specific transaction identifier of a current transaction, a transaction timestamp, and transaction data associated with the current payment transaction;

the memory of the processing server being further configured to store the transaction data and the payment credentials associated with the future payment transaction in the blockchain a querying module of the processing server configured to execute a query on the memory, the query identifying a specific data value included in a specific block of the plurality of blocks comprising the blockchain where the second unique transaction identifier of the future payment transaction corresponds to the specific transaction identifier of the current payment transaction; and a verification module of the processing server configured to verify that:
the user computing device which generated the first transaction request associated with the future payment transaction also generated a second transaction request associated with the current payment transaction, wherein the digital signature of the user computing device is verified using the stored consumer public key of the cryptographic private-public key pair; and the block timestamp included in the block header of the specific block of the future payment transaction is within a predetermined period of time of the transaction timestamp of the current payment transaction, wherein the querying module of the processing server is further configured to execute a query if the digital signature of the user computing device is successfully verified, the query being executed to identify payment credentials associated with a user transaction account corresponding to the specific data value, wherein the payment credentials are identified following successful verification, and the transaction processing module of the processing server is configured to initiate the current payment transaction between the merchant system and the user transaction account by submitting a transaction message, which includes using at least the identified payment credentials stored in the blockchain and the transaction data associated with the future payment transaction, to a payment network over payment rails.

10. The system of claim 9, wherein
the transaction data includes at least a transaction amount and account information associated with a merchant transaction account of the merchant system, and
the payment transaction is for payment of the transaction amount from the user transaction account to the merchant transaction account.

11. The system of claim 9, wherein the data message is received by the processing server via a communication network that does not utilize payment rails.

12. The system of claim 9, wherein
the payment credentials are further identified following successful verification of the digital signature.

13. The system of claim 9, wherein the payment credentials are identified in a data value included in one of the plurality of blocks comprising the blockchain.

14. The system of claim 9, further comprising:
an account database of the processing server configured to store an account profile, wherein the account profile is a structured data set related to the user transaction account and includes at least the payment credentials and an identification value, wherein
identifying the payment credentials includes executing a query on the account database to identify the account profile and the payment credentials included therein.

15. The system of claim 14, wherein the specific data value further includes the identification value.

16. The system of claim 14, wherein the identification value is a blockchain identifier associated with the blockchain.

\* \* \* \* \*